June 24, 1969 W. W. FRITSCHI 3,452,220

PULSE CORRECTOR CIRCUIT

Filed June 8, 1966

INVENTOR
W. W. FRITSCHI
BY SE Hollander
ATTORNEY 3,452,220

PULSE CORRECTOR CIRCUIT

Walter W. Fritschi, Atlantic Highlands, N.J., assignor to Bell Telephone Laboratories, Incorporated, Murray Hill, N.J., a corporation of New York Filed June 8, 1966, Ser. No. 556,172
Int. Cl. H03k 17/26, 17/28
U.S. Cl. 307—293 9 Claims This invention relates to pulse correcting circuits for use in telephone switching systems and, more specifically, to circuits for providing pulses of predetermined output duration in response to input pulses of varying intervals.

Figures 1, 1A, 1B, 1C, 1D:
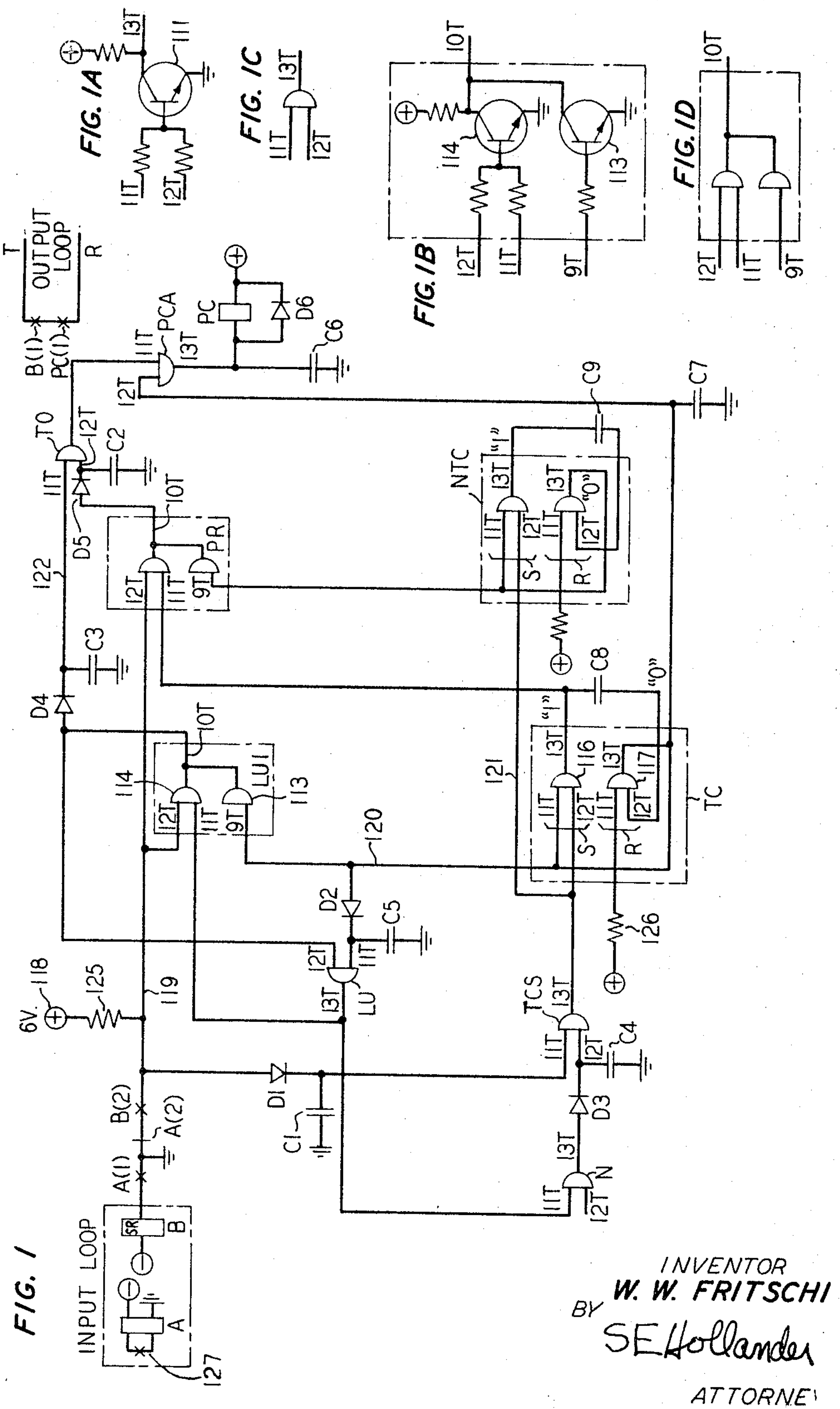

In a number of telephone switching systems, control functions are transmitted in the form of direct-current pulses. The transmission of dial pulses under the control of a calling customer is a familiar illustration of this type of signaling.

Each so-called dial pulse includes two basic elements referred to as the "make" interval and "break" interval. As used in connection with dial pulsing the "make" interval encompasses the period of time during which the dial pulse contacts are closed, whereas the "break" interval refers to the period of time during which the dial pulse contacts are open. A particular train of dial pulses is designed, on generation, to conform to certain minimum intervals for both the "break" portion and "make" portion of a dial pulse. For example, if a dial pulse rate of 12.5 pulses per second is assumed, the ratio of "break" duration to "make" duration may be 50 milliseconds to 30 milliseconds for each 80 millisecond pulse.

It is well known that pulses which initially are of relatively uniform characteristics having desirable break/make ratios, may be subsequently distorted by the circuitry and channels for transmitting these pulses to remote switching equipment such that an initially acceptable pulse becomes modified in time duration as well as break/make ratio by passage through inductive and capacitive impedances.

As a result, pulse correctors are used which are capable of receiving distorted signals and retransmitting such signals in improved pulse form.

In addition to discharging the required functions of a pulse corrector in compensating for distorted pulses, it is necessary for such a circuit to reject spurious pulses. Such pulses may derive, for example, from false contact closure or opening in consequence of relay armature bound or rebound.

In certain prior art devices, delay or threshold circuits were interposed at the input to the circuit to prevent the circuit from responding to pulse transitions of less than predetermined duration. For example, if a threshold interval was 10 milliseconds and if the input pulse subsisted for 8 milliseconds, the circuit would not respond and no output pulse would be produced. While, in general, operative and useful for their intended purpose, such prior art arrangements presented a disadvantage in the case of so-called "split" pulses. Thus, an input pulse may comprise a "break" or loop open interval of 8 milliseconds followed by a "false" make interval or reclosure of 8 milliseconds and thereafter succeeded by the remainder of the break pulse which may, for example, be a total of 50 milliseconds including the false make.

In certain prior art arrangements, as indicated above, the initial 8 millisecond portion of the break interval will be rejected by the threshold device as will the subsequent 8 millisecond false make interval deriving from armature rebound. Moreover, such prior corrector circuits would not begin their interval timing function until after the 10 millisecond threshold after the cessation of the false make pulse.

Thus, in certain prior correcting circuits, the output pulse would be delayed or out-of-phase for an interval corresponding to the cumulative duration of the initial portion of the legitimate break interval (8 milliseconds), the subsequent "false" make interval (8 milliseconds), and an additional threshold interval (10 milliseconds) for a total of 26 milliseconds.

At other times, only the 10 milliseconds delay may be interposed, if no false make interrupts the break signal. Thus, a variable delay interval is interposed between the input and output break intervals.

It is therefore an object of this invention to provide a pulse correcting circuit for delivering an output pulse within a constant predetermined interval after the initial transition of an input pulse.

Still another object of this invention is to provide for the timing of spurious pulses within the internal timing interval of the pulse corrector circuit rather than prior to the initiation of timing in the pulse corrector circuit.

These and other objects and features of the invention are achieved in a specific illustrative embodiment in which a first timing circuit utilized for governing make intervals and a second timing circuit responsive for detecting spurious pulses are simultaneously energized. The second timing circuit is of shorter duration than the first timing circuit and an input gate or logic arrangement is responsive to the cessation of the input pulses during the timing interval of the second timing circuit for aborting the operation of and preventing an output from the corrector circuit. Moreover, if the second timing circuit has completed the measured timing interval and the input pulse subsists thereafter during the remainder of the timing interval of the first timing circuit a pulse will be delivered to the output circuit.

Under these conditions, the timing facilities for detecting spurious or transient pulses is incorporated within the timing interval of the first timing means. In consequence, the output which is responsive to the first transition of the input pulse is delivered with a constant predetermined interval dependent on the duration of the first timing circuit and is exclusive of or independent of false transitions due to armature rebounds within the timing interval of the first timing means.

As an illustration, if a legitimate break pulse is initiated and after 5 milliseconds a false make pulse is experienced of a duration of 8 milliseconds due to armature rebound and if the second timing circuit has an interval greater than 13 milliseconds, the circuit will operate in a normal manner providing a single output pulse interval in response to the input pulse interval, while ignoring the false make interval of 8 milliseconds. In consequence, the interval between the input and output pulses will be determined exclusively by the first timing circuit and will be independent of false transitions during that interval of a duration less than the timing interval of the second timing circuit.

These and other objects and features of the invention may be more readily comprehended from an examination of the following specification, appended claims and attached drawing in which:

FIG. 1 shows one specific illustrative embodiment of applicant's invention as a digital pulse corrector having a preset make interval and including an internal timer for controlling response to split pulses; and FIGS. 1A and 1B show the details of the gates of FIG. 1, and FIGS. 1C and 1D are the symbolic representation of FIGS. 1A and 1B, respectively.

Referring to FIG. 1, it is seen that input pulses which appear on the input of relay A are repeated through the corrector circuit to the output loop over the contacts B(1) and PC(1). All of the gates, LU1, LU, PR etc., require all input potentials at ground to produce an output at a nominal 3-volt potential. FIGS. 1A and 1B, shown in detail, are typical gates shown in block outline in FIG. 1. The monopulsers NTC and TC, shown only in outline form, are obtained by interconnecting gate modules of FIGS. 1A and 1B, as shown.

As seen from FIG. 1A, a positive potential on terminals 11T or 12T will cause transistor 111 to conduct and drive terminal 13T of the gate toward ground potential. Moreover, a ground condition simultaneously on terminals 11T and 12T will drive transistor 111 into the nonconducting condition and cause a 3-volt potential to appear at output terminal 13T.

A similar analysis applies with respect to transistors 113 and 114 of FIG. 1B wherein a positive potential on any terminal 9T, 11T or 12T will effect a ground condition at terminal 10T at the output of the gate. A simultaneous ground condition on terminals 9T, 11T and 12T will proproduce a nominal 3-volt potential at terminal 10T.

In the case of monopulser TC, "S" (set) input terminals 11T and 12T are normally at ground condition with a 3-volt potential at "1" output terminal 13T. The "0" output terminal 13T is normally near ground potential due to conduction of gate 117 as a result of the small bias current furnished to "R" (reset) input terminal 11T over high resistance 126. When the monopulser TC is triggered by a positive potential at "S," terminals 11T or 12T, as explained herein, gate 116 is driven into the conducting condition and a near ground potential appears at "1" terminal 13T for a period determined by capacitor C8. Gate 117 is driven to the nonconducting condition through voltage divider action at the input including resistance 126 and a 3-volt potential appears at "0" terminal 13T. After a predetermined interval, condenser C8 discharges and input "R" terminal 12T returns to a slightly positive condition to turn on gate 117 and return "0" terminal 13T to ground.

When the incoming loop connected to relay A is idle, both relays A and B are released. The contacts B(1) of relay B hold the output loop open. Monopulser TC is normal with the "0" output terminal 13T at near ground potential in view of the positive bias on "R" terminal 11T of the monopulser. A 6-volt potential is applied from battery 118 over resistance 125 to terminal 12T of gate LU1 maintaining terminal 10T of gate LU1 at near ground. Also, the same 3-volt potential applied to 12T of gate PR holds its output at near ground. As a result, since both inputs are at ground, gate TO will have a 3-volt potential at the output thereof to maintain gate PCA conducting (output terminal 13T of gate PCA at ground) and hold relay PC operated.

Assuming that the input loop to relay A is closed (as shown symbolically by contacts 127) as a result of a dial pulse closure or line seizure, for example, relay A is operated over an obvious path and effects the operation of relay B over contacts A(1). The contacts B(1) close the outgoing loop conductors T and R through contacts PC(1) which are closed in view of the normally operated condition of relay PC, as explained above.

Thereafter, the first dial pulse or loop open condition at the input to relay A releases relay A but slow-release relay B is designed to remain operated during intervals between dial pulses of the same digit. In consequence, a path may be traced from ground, contacts A(2), B(2), and diode D1, to terminal 11T of gate TCS. This ground condition is applied when capacitor C1 discharges after a nominal interval of, illustratively, 10 microseconds. This interval is designed to provide relatively immediate response of the corrector to an input pulse but to guard against extremely short duration transient or spurious high frequency noise voltage conditions on the line.

It will be noted that terminal 12T of gate TCS was priorly at ground condition at the output terminal 13T of gate N in view of the 3-volt potential at the output terminal 13T of gate LU. The input terminal 11T of gate LU is at ground from the "0" output terminal 13T of monopulser TC and the input terminal 12T of gate LU is at ground from the output terminal 10T of gate LU1, as discussed above.

When the capacitor C1 has discharged through terminal 11T of gate TCS, the output terminal 13T of gate TCS rises to a 3-volt level after a nominal .01 millisecond delay. In consequence, monopulser TC is triggered and delivers a 3-volt signal at "0" terminal 13T for a timed interval of illustratively 33 milliseconds as determined by capacitor C8. Thereupon, gate 117 is reset and the "0" output terminal 13T returns to near ground.

In the interim, gate LU drops from a 3-volt level at terminal 13T to a near ground condition in view of the 3-volt signal from "0" terminal 13T over conductor 120 and diode D2. In consequence, gate N changes state and terminal 13T thereof is driven from ground to 3 volts. This signal, which is brought from terminal 13T of gate N over diode D3 to terminal 12T of gate TCS prevents gate TCS from further response to input signals over contacts A(2), B(2) and diode D1 during the operating interval of monopulser TC.

Capacitor C4 provides a sufficient delay to guarantee setting monopulsers TC and NTC prior to inhibition of sensitivity to conditions on conductor 119.

Monopulser NTC was energized over conductor 121 at the same time that monopulser TC was energized. Monopulser NTC, in consequence, delivers a 3-volt output from "0" terminal 13T to terminal 9T of gate PR for an interval determined by capacitor C9 in a manner similar to that explained for monopulser TC. For illustrative purposes, it will be assumed that the operating interval of monopulser NTC is 15 milliseconds. Gate PR may produce a 3-volt signal at its output terminal 10T only when monostable NTC is reset ("0" terminal 13T at ground), monopulser TC is set ("1" terminal 13T at ground) and contacts A(2) are closed to apply a ground condition to conductor 119.

It is seen that these conditions cannot exist until monostable NTC has completed its timing interval and "0" terminal 13T thereof has returned to near ground. Consequently, if an input pulse has succeeded in triggering monopulsers TC and NTC but did not persist longer than the timing interval of monopulser NTC (15 milliseconds) gate PR would not be energized and condenser C2 would not start to charge. Instead, the circuit would return to normal after the timing interval of monopulser TC without delivering a pulse at the output loop. Thus, a pulse which is of a duration less than the timing interval of monopulser NTC will trigger the corrector into operation but the operation will be aborted without an output pulse.

It will be assumed however that the dial pulse being repeated (loop open condition) permits contacts A(2) to remain closed after monopulser NTC completes its timing interval. Thereupon the 3-volt signal at terminal 10T of gate PR will cause condenser C2 to accumulate a charge during the remainder of the timing interval of monopulser TC, illustratively, 18 milliseconds.

When monopulser TC completes its timing interval, condenser C2 discharges into gate TO to hold terminal 13T of gate TO at near ground potential for an interval determined by condenser C2, illustratively 62 milliseconds. This ground condition is applied to terminal 11T of gate PCA and with the ground condition applied to terminal 12T of gate PCA deriving from "0" terminal 13T of monopulser TC causes terminal 13T of gate PCA to approach 3 volts and release relay PC.

Gate PCA will attempt to maintain a 3-volt potential at its terminal 13T for a period determined by capacitor C2 which, as indicated, has been assumed to be 62 milliseconds. But gate PCA can only maintain a 3-volt potential at its terminal 13T until either terminal 11T or 12T of gate PCA leaves the ground condition. Terminals 12T of gate PCA will remain at the ground potential until monopulser TC is energized once more. Terminal 11T will remain at ground until capacitor C2 has discharged sufficiently to return terminal 12T of gate TO to a ground condition (an interval of 62 milliseconds).

After the timing interval of capacitor C2, terminal 11T of gate TO determines the condition of relay PC. If contacts A(2) remain closed, a path may be traced from ground contacts A(2), B(2), terminal 12T of gate LU1 to drive gate 114 into the nonconducting condition. Since gate 113 remains nonconducting, terminal 10T of gate LU1 is at a 3-volt potential to maintain the output of gate TO at ground. Since gates PCA must have both input terminals at ground to maintain relay PC in the nonconducting condition, the re-operation of relay PC is determined by the contacts A(2) and the delay in change of state on conductor 122 produced by capacitor C3. Capacitor C3 provides a means of equalizing the delays in transition between open and closed states of the output loop leads T, R by interposing a delay prior to the reoperation of relay PC in response to relatively long on-hook "wink" signals.

When relay A is again operated on the following dial pulse closure or make interval, the 3-volt potential from battery 118 over resistance 125 provides a near ground signal at terminal 10T of gate LU1 by energizing gate 114. This signal may be traced over diode D4 and conductor 122 to terminal 11T of gate TO. The near ground condition at terminal 10T of gate LU1 may also be traced to terminal 12T of gate LU to drive terminal 13T of gate LU to a 3-volt potential which is inverted by gate N to provide a ground condition at terminal 13T of gate N over diode D3 to terminal 12T of gate TCS. Relay PC is reoperated by the ground condition at the output of gate PCA when gate PCA is energized by the 3-volt potential at terminal 13T of gate TO.

The 3-volt potential from battery 118 extends over resistance 125 and diode D1 to terminal 11T of gate TCS. Terminal 13T thereof is therefore at a ground condition and monopulser TC remains in the reset condition.

When relay A releases on the next pulse open interval, the entire cycle is repeated.

Each time gate TCS and monopulser TC are energized, a delay equal at minimum to the timed interval of monopulser TC is introduced before relay PC can once more be released in view of the necessity for "0" terminal 13T of monopulser TC to return to ground in order that terminals 11T and 12T of gate PCA be at ground to drive terminal 13T of gate PCA to the nominal 3-volt condition required for release of relay PC. Thus, once relay PC is reoperated and the output loop has been closed over conductors T and R through contacts B(1) and PC(1), relay PC cannot be released for an interval equal at minimum to the operating time of monopulser TC (33 milliseconds) plus the nominal delay of capacitor C1 (e.g., .01 millisecond), guaranteeing a closed loop or make interval of at least 33 milliseconds before the next break interval.

As indicated above, when monopulser TC has completed its timing function, an illustrative 62 milliseconds loop open interval is governed by the discharge time of capacitor C2. Unless monopulser TC is energized during the 62 millisecond interval of condenser C2, relay PC will not be reoperated since terminal 11T of gate PCA will be maintained at ground potential through gate TO by condenser C2, whereas terminal 12T of gate PCA is normally at ground when monopulser TC is reset. It is apparent that while terminal 12T of gate TO is maintained at a level higher than ground during the discharge of condenser C2, the input to terminal 11T of gate TO is not critical.

However, relay PC can be reoperated before the 62 millisecond delay interval of condenser C2 if terminal 12T of gate PCA is driven to a 3-volt level. This will happen if monopulser TC is triggered "early" during the break interval whereupon "0" terminal 13T will deliver a 3-volt potential at the output terminal during the timing interval of monopulser TC.

It is to be understood that the above-described arrangements are illustrative of the application of the principles of the invention. Numerous other arrangements may be devised by those skilled in the art without departing from the spirit and scope of the invention.

What is claimed is:

1. A pulse corrector circuit for use in communication systems for delivering an output pulse after a substantially fixed interval following the initial transition of an input pulse comprising first and second timing means operable responsive to said input pulse, said second timing means having a timing interval shorter than said first timing means, and gating means responsive to the subsistence of said input pulse for an interval following the completion of timing in said second timing means and during the continuation of timing in said first timing means for controlling the delivery of an output pulse from said corrector circuit, said gating means being additionally responsive to the cessation of said input pulse during the timing interval of said second timing means to abort the operation of said corrector circuit and preclude the delivery of an output pulse.

2. A pulse repeating circuit for use in communication systems for delivering an output pulse after a substantially constant interval following an initial transition of an input pulse and for rejecting spurious input pulses comprising first timing means and second timing means responsive to the initial transition of said input pulses, said first timing means having a timing interval greater than said second timing means, said second timing means having a timing interval longer than the longest anticipated spurious pulse, pulse rejection gating means, and third timing means, said pulse rejection gating means being jointly responsive to the completion of timing in said second timing means and the subsistence of said input pulse during the continuation of timing in said first timing means for energizing said third timing means to deliver an output pulse of predetermined duration governed by said third timing means.

3. A pulse repeating circuit in accordance with claim 2 comprising in addition means responsive to the initiation of timing in said first timing means for precluding the delivering of subsequent pulses to said first timing means during the timing interval of said first timing means.

4. A pulse repeating and correcting circuit for delivering output pulses after a substantially uniform timing interval following the initial transition of an input pulse and for rejecting spurious pulses comprising first and second transistor timing means, said first timing means having a timing interval longer than said second timing means, said second timing means having a timing interval longer than the longest anticipated false pulse, output gating means for delivering an output pulse in response to one of said input pulses, and pulse rejection gating means responsive to the cessation of said input pulse during the timing interval of said second timing means for precluding the operation of said output gating means, said pulse rejection gating means being additionally responsive to the completion of timing in said second timing means and the continuation of said pulse during the remaining timing interval of said first timing means for energizing said output gating means to deliver an output pulse.

5. A pulse repeating and correcting circuit in accordance with claim 4 including in addition third timing means responsive to said pulse rejection gating means for governing the operation of said output gating means to provide an output pulse of predetermined interval.

6. A pulse correcting and repeating circuit for delivering output pulses after a substantially fixed interval following the initial transition of a particular input pulse comprising a source of input pulses, first and second transistor timing means responsive to said particular input pulse, said first timing means having a timing interval greater than said second timing means, said second timing means having a timing interval greater than the longest anticipated false pulse, output transistor gating means for delivering an output pulse from said correcting circuit, and pulse rejection gating means connected to said first and second timing means and said source of input pulses and responsive to the subsistence of said input pulse after the completion of timing in said second timing means and during the remainder of said timing interval in said first timing means for energizing said output gating means to deliver an output pulse, said pulse rejection gating means being additionally responsive to the cessation of said input pulse during the timing interval of said second timing means for aborting the operation of said correcting circuit and precluding the energization of said output gating means.

7. A pulse correcting and repeating circuit for delivering output pulses within a predetermined interval following the initial transition of an input pulse in accordance with claim 6 including in addition inhibiting means responsive to the initiation of timing in said first timing means for precluding the delivery of additional pulses to said first timing means during the timing interval of said first timing means, said inhibiting means comprising a transistor gating circuit coupled to said first timing means and said source.

8. A pulse correcting and repeating circuit for delivering output pulses within a predetermined interval following the initial transition of an input pulse from a make condition to a break condition comprising first and second transistor timing means energizable in response to said input pulse, said first timing means having a timing interval greater than said second timing means, said second timing means having a timing interval greater than the longest anticipated spurious pulse, pulse rejection transistor gating means, third timing means including capacitor means, output transistor gating means, said pulse rejection gating means being responsive to the subsistence of one of said input pulses after the completion of timing in said second timing means and during the remaining timing interval of said first timing means for energizing said third capacitor timing means, said output transistor gating means being responsive to the completion of timing in said first timing means for delivering an output pulse corresponding to the timing interval of said third timing means, and means coupling said output gating means to said second timing means to prematurely arrest the operation of said third timing means.

9. A pulse repeating and correcting circuit in accordance with claim 8 including fourth equalizing timing means for controlling said output gating means to deliver a make output pulse after a delay interval corresponding to said delay interval prior to delivery of a break output pulse as controlled by said first gating means.

References Cited

UNITED STATES PATENTS

| | | | |
|---|---|---|---|
| 2,938,955 | 5/1960 | Molar | 179—16.4 |
| 3,092,691 | 6/1963 | Burns et al. | 179—16.4 |
| 3,312,784 | 4/1967 | Draper | 179—16.4 |

ARTHUR GAUSS, *Primary Examiner.*

B. P. DAVIS, *Assistant Examiner.*

U.S. Cl. X.R.

179—16; 307—260, 265